March 8, 1966   L. J. BERKELEY   3,239,122
APPARATUS FOR PRODUCING SPIRAL PIPE
Original Filed Feb. 10, 1958   6 Sheets-Sheet 1

INVENTOR.
LAURENCE J. BERKELEY

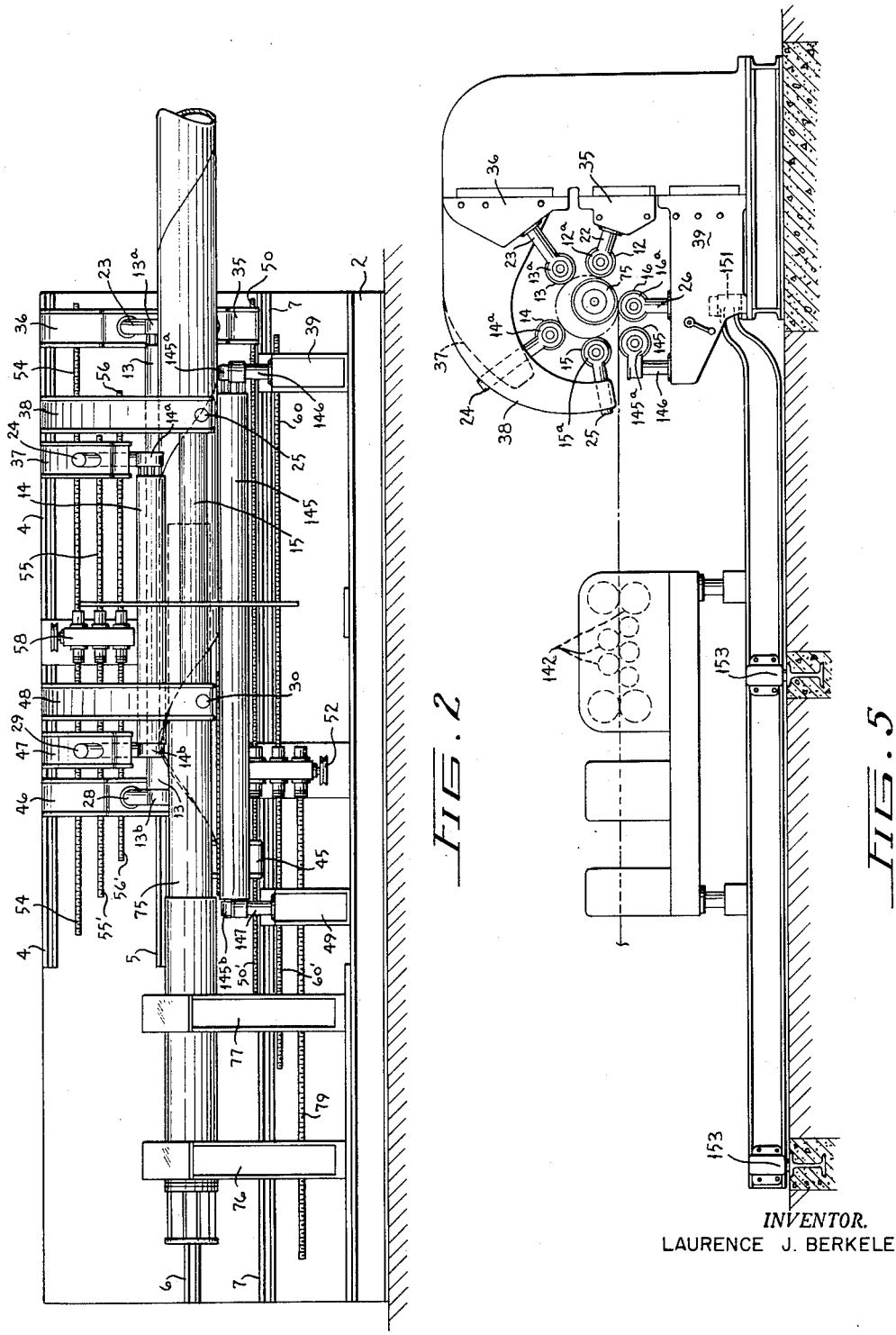

March 8, 1966 L. J. BERKELEY 3,239,122
APPARATUS FOR PRODUCING SPIRAL PIPE
Original Filed Feb. 10, 1958 6 Sheets-Sheet 3
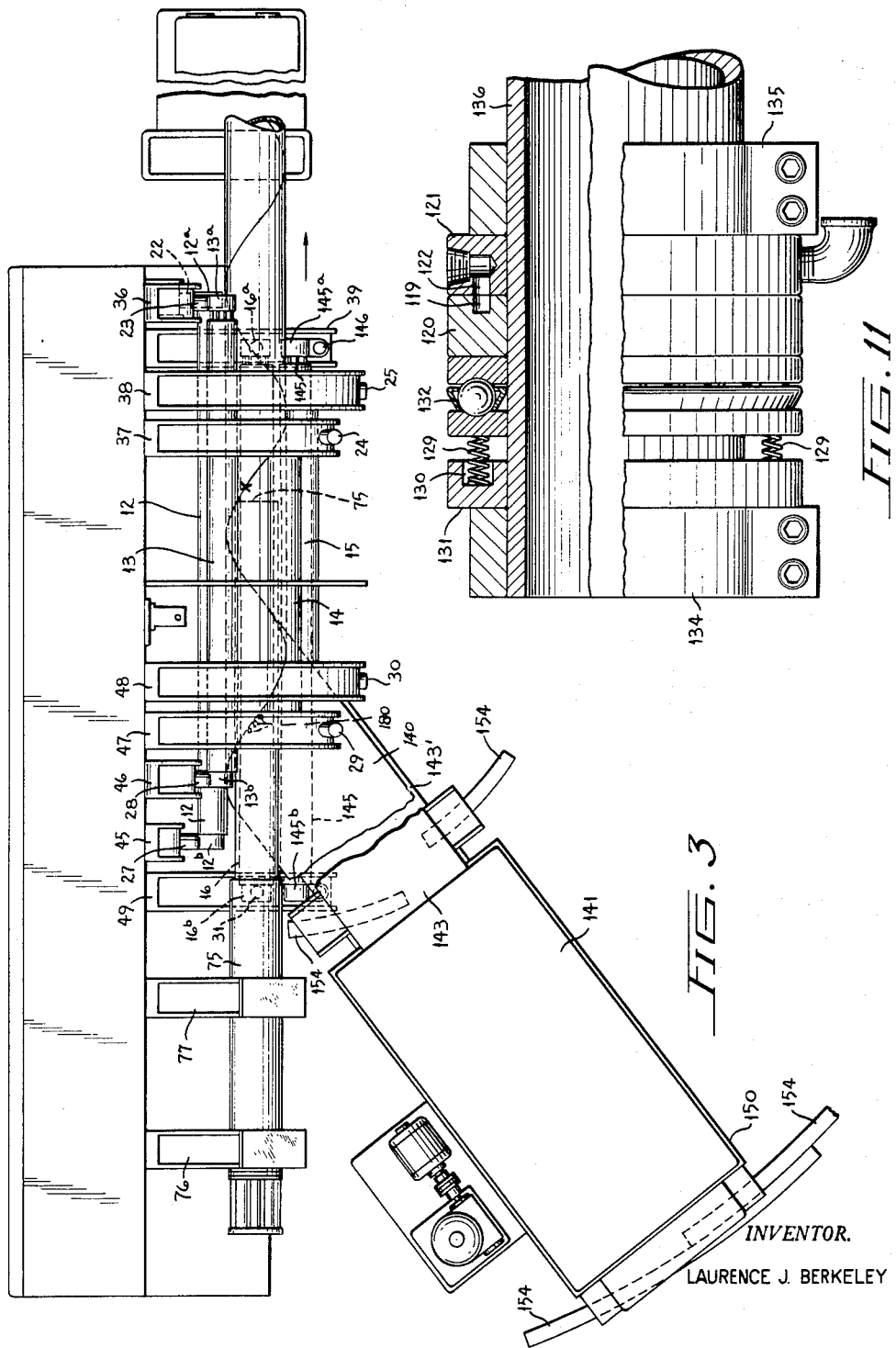
INVENTOR.
LAURENCE J. BERKELEY March 8, 1966  L. J. BERKELEY  3,239,122
APPARATUS FOR PRODUCING SPIRAL PIPE
Original Filed Feb. 10, 1958  6 Sheets-Sheet 4
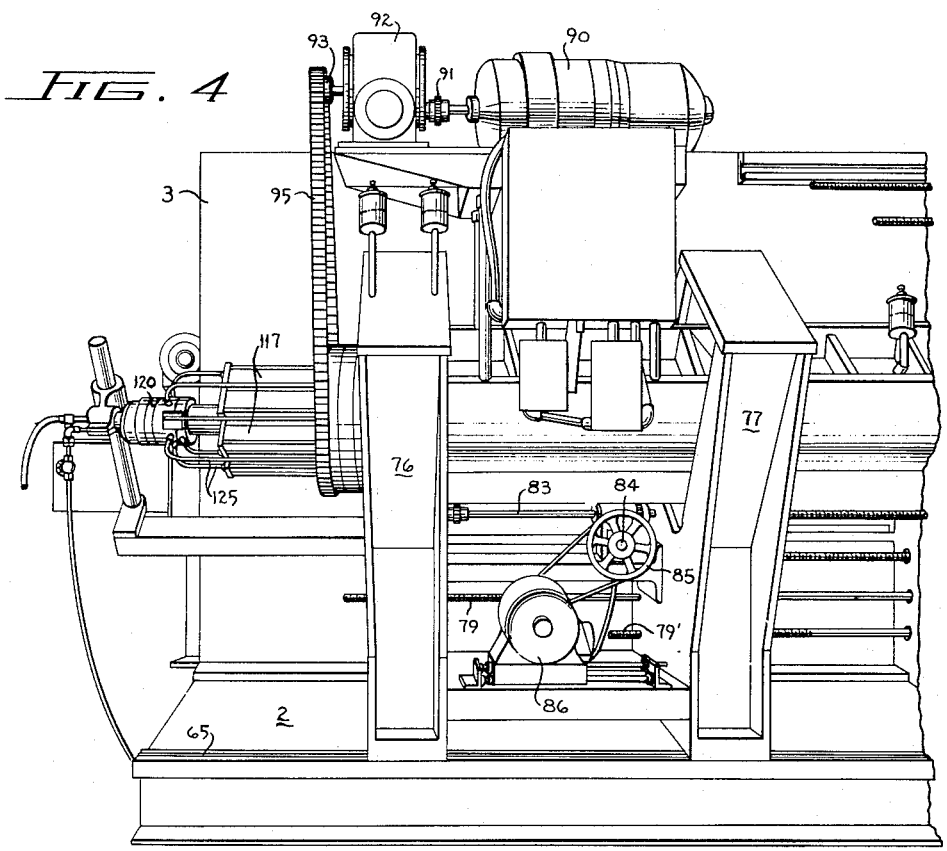
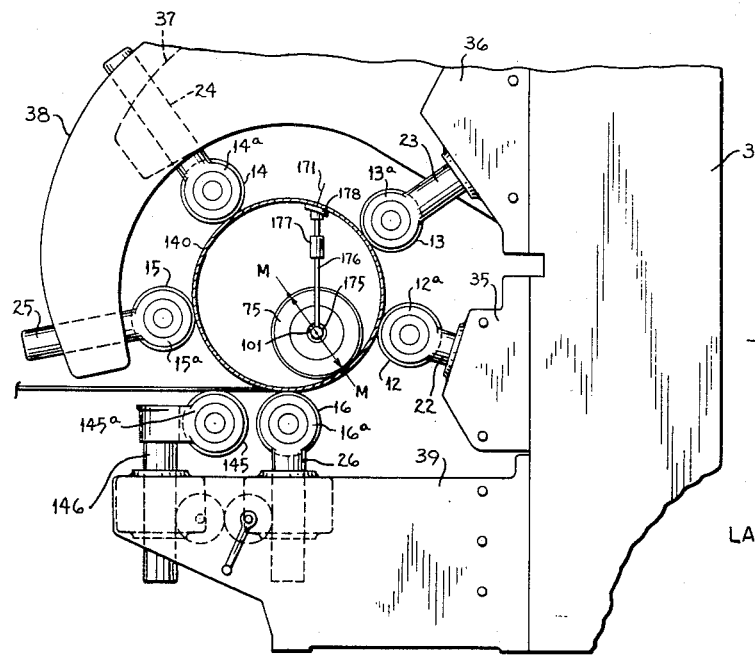
INVENTOR.
LAURENCE J. BERKELEY March 8, 1966  L. J. BERKELEY  3,239,122
APPARATUS FOR PRODUCING SPIRAL PIPE
Original Filed Feb. 10, 1958  6 Sheets-Sheet 5

INVENTOR.
LAURENCE J. BERKELEY

INVENTOR.
LAURENCE J. BERKELEY

United States Patent Office 3,239,122
Patented Mar. 8, 1966

3,239,122
APPARATUS FOR PRODUCING SPIRAL PIPE
Laurence J. Berkeley, 205 E. Woodlawn Ave.,
Danville, Ill.
Original application Feb. 10, 1958, Ser. No. 714,098.
Divided and this application Aug. 2, 1962, Ser. No. 220,346
4 Claims. (Cl. 228—15)

This application is a division of a previously filed application, Serial No. 714,098, filed February 10, 1958, now Patent No. 3,093,103 issued June 11, 1963, and now entitled "Method of Producing Spiral Pipe."

My invention relates to apparatus for producing pipe which is formed by helically winding an elongated strip of metal into a series of related convolutions which are welded to each other at the edges of the convolutions. Pipe so produced is commonly called spiral pipe, or spirally formed pipe.

One feature of my invention is that spiral pipe produced by my apparatus is, at any point, not only within the normal commercial requirements of accuracy and ovality, but also within the most stringent requirements in such respects for certain applications of the Ordinance Department of the United States.

Another feature of my invention is that with the use of my apparatus, the strip is curled to a diameter slightly larger than the desired diameter of the spiral pipe being produced, and such slightly larger diameter curled strip is confined in a cage of elongated rolls, the effective diameter of the cage being that of the desired diameter of the pipe being produced. Such difference in diameters effects a certain amount of "cold working" of steel strip, and no special devices or equipment are required to keep the edges even in up and down direction. Such difference in diameters assures both roundness of the pipe and that it is of the desired diameter. Although such difference in diameters induces no circumferential resistance to the movement of the curled strip in the cage of rolls as would tend to unwind or open the "seam," said rolls do exert a longitudinal resistance which tends to assure abutment of the edges for welding.

Another feature of my invention is that the camber commercially allowable in steel strip, as received from the rolling mills, is absorbed during the production of spiral pipe with the use of my improved apparatus.

As received from the rolling mills, steel strip or sheet, of the character used in the manufacture of spirally formed pipe, has a slight lateral camber which ordinarily would interfere with the proper registry of the edges of the sheet when wound helically into tubular or pipe form. Any flat metal piece produced by rolling is characterized by camber, and this camber is not uniform; it may not be compensating; and generally is unpredictable. Camber of ¼" per 8' of length is allowable in steel strip as sold commercially by rolling mills.

With the use of previously known apparatus, when such cambered flat steel strip is wound helically in the absence of special devices or equipment, the pipe which is produced either will not be of uniform diameter or it will have imperfect welds. Both of these results render the pipe unsalable commercially. Many attempts have been made to overcome the difficulties mentioned above with the use of various devices and equipment, and none have been completely satisfactory.

Another feature of my invention is that the welded joint of steel pipe produced by my apparatus is free from leaks and is capable of withstanding high pressures without rupture, or bursting. Tests made by the Ordinance Department of the United States of spirally formed and welded steel pipe made with my method and apparatus have established that the bursting, or rupture, point of such pipe is that of the parent metal, and never at the weld. Such tests were made even with pipe produced from #130 steel strip. Heretofore it had been believed to be impossible to satisfactorily form and weld spiral pipe from #4130 steel strip because of the inherent "spring back" characteristics of such a steel.

Another feature of my invention is that with the use of my apparatus, spiral pipe may be produced from almost any of the various types of carbon steels, or carbon alloy steels.

Another feature of my invention is that with the use of my improved apparatus, spirally formed and welded pipe in a very wide range of diameters may be produced continuously from a wide range of widths and thicknesses of metal strip.

Referring to said drawings:

FIG. 2 is a front side elevation of a spiral pipe forming and welding apparatus as indicated in FIG. 1.

FIG. 3 is a top plan view of the spiral pipe forming and welding apparatus, roller leveler, strip feeding means, indicated in FIGS. 2 and 1.

FIG. 4 is an enlarged fragmentary front side elevation of the left-hand end portion of the apparatus shown in FIG. 2.

FIG. 5 is a somewhat diagrammatic front end elevation of the structures shown in FIG. 1.

FIG. 6 is an enlarged fragmentary front end elevation of the apparatus shown in FIG. 2.

FIG. 11 is an enlarged view of the air cylinder valve assembly to which the air cylinders for a slatted roll are connected.

Figure 1:
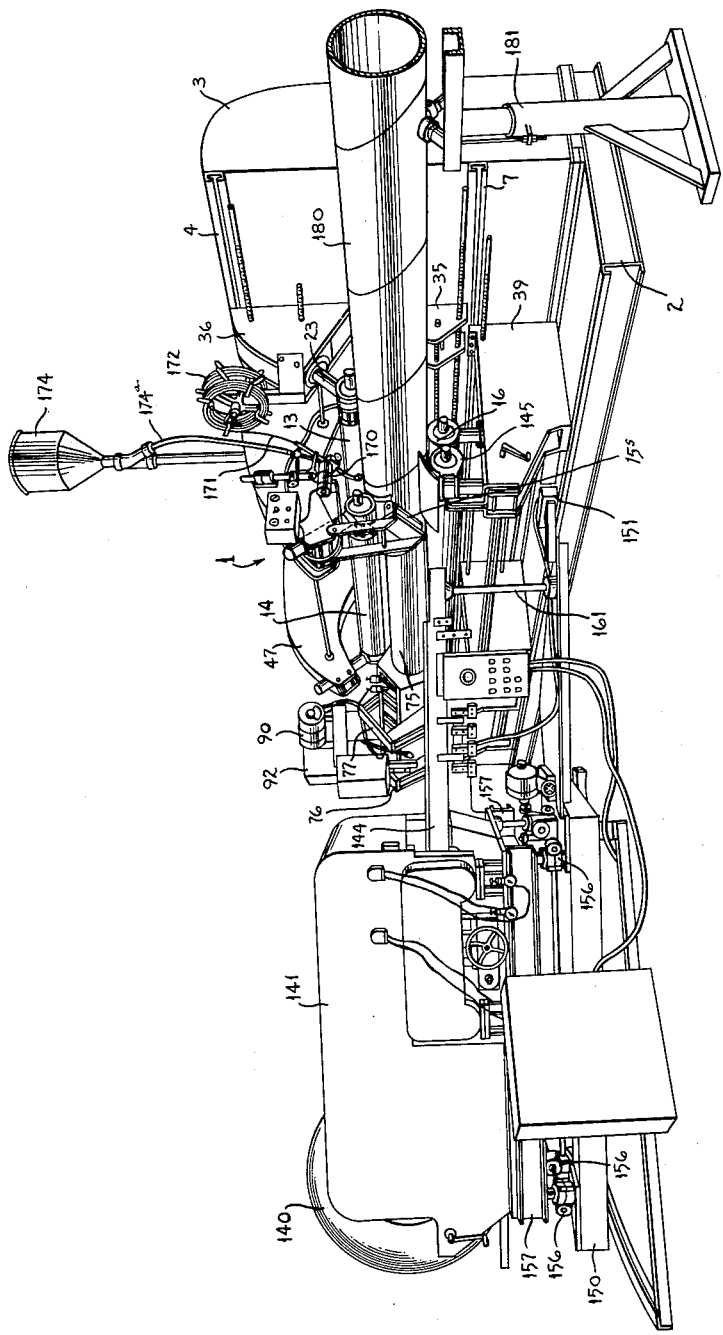
FIG. 1 is a perspective view showing generally a form of spiral pipe forming and welding apparatus embodying my invention; a metal strip and a roller leveler; means for feeding uncoiled strip to the apparatus; etc.

In the production of a wide range of diameter sizes of spiral pipe from various types of steel strip of wide ranges of width and thicknesses with the use of my improved apparatus, all of the outer rolls and the center roll, or mandrel roll, of the cage of rolls of the apparatus may be of a solid roll construction, i.e. an ordinary roll having a solid outer surface.

In the production of spiral pipe of some diameters and wall thicknesses, it may be more desirable to have the center roll, or mandrel roll, and/or one or more or all of the outer rolls which form the cage of rolls of a slatted construction in order to facilitate the movement of the strip as it is wound helically by the apparatus. What I term a "slatted" form of roll, is a cylindrical roll comprised of segments, each segment independently being capable of movement axially for a predetermined distance toward the front end of the apparatus along with the pipe being formed. As a segment of such a roll rotates out of contact with the workpiece, that segment of the roll is returned automatically to its initial position, or towards the rearward end of the apparatus shown in the drawings.

The essential features of my improved apparatus for producing spiral pipe are the same whether the rolls be of solid form, or of slatted form, or combinations of both forms.

Although in the drawings only the center roll, or mandrel roll, is shown as a driven roll, it is to be understood that any or all of the outer rolls may be driven in a similar manner, if desired.

Referring to the drawings; the spiral pipe forming and welding apparatus, indicated generally by the reference mark 1, is mounted on a horizontal bed plate, or base, 2 which has rigidly secured thereto a vertical supporting column member 3. The column member 3 is provided, conveniently, with four spaced-apart horizontal guideways, which are indicated at 4, 5, 6, and 7 in FIGS. 1 and 2. Each of said guideways 4, 5, 6, and 7 has a T-shaped slot in which T-head screw-threaded studs are slidably mounted for rigidly securing roll support members to the column member 3, as hereinafter described.

As best shown in FIG. 6, a series of outer rolls which form a roll cage includes a lower rear roll 12, and upper rear roll 13, an upper front roll 14, a lower front roll 15, and a bottom roll 16, which are journalled at their front ends in respective bearings 12a, 13a, 14a, 15a, and 16a. The bearings 12a, 13a, 14a, 15a, and 16a are formed at the inner ends of their respective shafts 22, 23, 24, 25, and 26. The rolls 12, 13, 14, 15, and 16 are journalled at their rear ends in respective bearings 12b, 13b, 14b, 15b, and 16b, formed at the inner ends of their respective shafts 27, 28, 29, 30, and 31.

The bearing shaft 22 is slidably mounted in a guide bearing in the roll support member 35; the bearing shaft 23 is slidably mounted in a guide bearing in the roll support member 36; the bearing shaft 24 is slidably mounted in a guide bearing in the roll support member 37; the bearing shaft 25 is slidably mounted in a guide bearing in the roll support member 38; and the bearing shaft 26 is slidably mounted in a guide bearing in the roll support member 39.

The bearing shaft 27 is slidably mounted in a guide bearing in the roll support member 45; the bearing shaft 28 is slidably mounted in a guide bearing in the roll support member 46; the bearing shaft 29 is slidably mounted in a guide bearing in the roll support member 47; the bearing shaft 30 is slidably mounted in a guide bearing in the roll support member 48; and the bearing shaft 31 is slidably mounted in a guide bearing in the roll support member 49.

As the spiral pipe apparatus is adaptable for producing spiral pipe from strip of varying widths and pipe of different diameters within a determined range, it is desirable that the front and rear roll supports for the rolls be movable as a unit to properly position the rolls with respect to the point of weld of the pipe being formed. Accordingly, the front and rear roll supports 35 and 45 for the lower rear roll 12 may be moved as a unit by means of screw shafts 50–50' cooperating with respective rigid nut means in the roll supports 35 and 45. The shafts 50–50' may be turned to effect simultaneous horizontal movement of both roll supports 35 and 45, in the well-known mechanical manner by means of clutch, gear, etc. means operatively connected to power drive means by a shaft and drive pulley, as indicated diagrammatically at 52 in FIG. 2.

Correspondingly, the roll supports 36 and 46 of the roll 13; the roll supports 37 and 47 of the roll 14; and the roll supports 38 and 48 of the roll 15 may be moved simultaneously in the same manner by respective screw shafts 54–54', 55–55', and 56–56' operatively connected in the same manner to pulley and motor means, as indicated diagrammatically at 58 in FIG. 2. The front roll support 39 and the rear roll support 49 for the bottom roll 16 may be moved simultaneously as a unit by means of screw shafts 60–60' operatively connected to the means indicated diagrammatically at 52, as heretofore described.

The means to effect simultaneous movement of the roll supports at the opposite ends of the rolls forms no part of my present invention, as various such means for effecting the desired purpose are old and well known, and require only ordinary designing skill of mechanical movements. Accordingly, I deem it not necessary to fully show and describe in detail any of the well-known various arrangements which may be utilized to effect the desired purpose.

When any one of the rolls 12 to 15, inclusive, has been moved to the desired position, the front and rear roll supports for the roll are rigidly secured to the column member 3 by means of the T-head screw-threaded studs extending through suitable openings in the roll support, provided with nuts at their outer ends. Of course, the T-head stud nuts must be loosened to enable the roll support to be slidably moved. The roll supports 39 and 49 for the roll 16 are secured in the same manner to the bed plate 2, which likewise is provided with guideways having a T-shape slot, as indicated at 65 in FIG. 4. Of course, the roll supports may be secured in any other well-known manner than that described.

The axes of the rolls 12 to 16, inclusive, are in parallel horizontal planes. As may be best observed from FIG. 6, the rolls 12 to 16, inclusive, of the cage of rolls are equally distant from the axis of any diameter pipe being formed. The bearing shafts 22 to 26, inclusive, respectively at the front ends of the rolls 12 to 16, inclusive, and the bearing shafts 27 to 31, inclusive, at the rear ends of the rolls 12 to 16, inclusive, are provided with key slots adaptable for sliding engagement with fixed keys to prevent rotational movement of the shafts 22–31, inclusive, in their respective guide bearings.

Each of the shafts 22–31, inclusive, is moved inwardly or outwardly by a jack screw of a well-known worm and worm gear type, rigidly mounted in the respective roll support member for the shaft. Each of the worm gears of the jack screws is provided with an internal screw-threaded axial bore which is in engagement with a screw thread formed on a portion remote from the bearing end of the respective shafts 22–31 mounted therein. The worm shafts of each of the jack screws for the shafts 22–31, inclusive, are all interconnected in the well-known mechanical manner by means of miter gears, shafts, spline shafts, etc. to a common drive shaft connected by clutch means to a motor-driven worm gear speed reducer, or the like. In the apparatus shown herein, said common drive shaft is connected selectively by clutch means to the motor-driven means which is used to effect horizontal movement of the roll support members.

With the drive shafts of the worms of all jack screws interconnected to a common drive shaft, all of the bearing shafts 22–31, inclusive, are moved simultaneously to effect simultaneous and concentric inward or outward movement of the rolls 12 to 16, inclusive, comprising the cage of rolls for helically winding the strip into a series of related convolutions.

Accordingly, when it is desired to form pipe of any diameter within the capacity of the apparatus, the center roll, or mandrel roll, is first moved out of position, if necessary, in the manner hereinafter described, and the rolls 12 to 16, inclusive, are moved simultaneously and concentrically, either inwardly or outwardly, as desired, until in a position where the effective diameter of the cage of rolls is that of the desired outside diameter of the pipe to be formed.

It is to be particularly noted that my invention is not limited to the apparatus which embodies a cage of 5 rolls as indicated in FIGS. 2 to 6, inclusive, as the cage of rolls may be formed of a greater number of rolls. Moreover, in FIG. 1, which was made from a photograph of an apparatus embodying my invention made for producing spiral pipe for a specific use, a small roll 15s is used in liep of the roll 15 of the apparatus shown in FIGS. 2 to 6, inclusive.

If the spiral pipe forming apparatus as heretofore described is to be utilized only in the production of pipe of the same diameter and from substantially the same width of steel strip, it would not be necessary to have the rolls mounted on bearing shafts which are selectively axially movable or the bearing shafts mounted in roll supports which are selectively slidably movable horizontally, as there would be no necessity for effecting any change in the effective diameter of the cage of rolls or in the positioning of the rolls.

A center roll 75, or mandrel roll, is journalled at its rearward end in two spaced-apart bearings, each of which is mounted on a shaft and jack screw member, within its respective support member 76 and support member 77, in a manner similar to that heretofore described with reference to the rolls 12 to 16. The support members 76 and 77 are mounted on the base member 2 in the same manner as heretofore described with reference to the roll supports 39 and 49 for the roll 16. The support members 76 and 77 may be moved simultaneously as a unit by means of the screw shafts 79–79' in the same manner as heretofore described with reference to the roll supports 39 and 49 for the roll 16.

The axis of the mandrel roll 75 is parallel to the axes of the rolls 12 to 16, inclusive. The two bearings for the mandrel roll 75 are adapted to be moved simultaneously by their shafts and jack screw members in an angular plane indicated by the dash line M—M in FIG. 6, to effect repositioning movement of the mandrel 75 necessitated by changes in the effective diameter of the cage rolls 12 to 16, inclusive, to produce a spiral pipe of different diameters. The dash line M—M in FIG. 6 indicating the angular plane of movement of the mandrel roll 75 is a line passing between the center of the cage or rolls and the median line between the axes of the bottom roll 16 and the lower rear roll 12, which in FIG. 6 is a plane substantially 36° from the vertical.

The respective jack screw members for the two bearings at the rearward end of the mandrel 75 are connected together for simultaneous movement by the shaft 83 which is operatively connected by suitable gearing to the shaft 84 on which is mounted the pulley 85. The pulley 85 is connected by a belt to an electric motor, indicated at 86.

The means to effect simultaneous movement of elements, such as bearings, with the use of jack screw members operatively connected to such elements forms no part of my present invention, as various means for effecting the desired purpose are well known, and require only the use of designing skill utilizing well-known mechanical movements. Accordingly, I deem it not necessary to show fully and described the specific details of the jack screw members, etc, as such constructions are old and well known in various arts.

Figure 8:
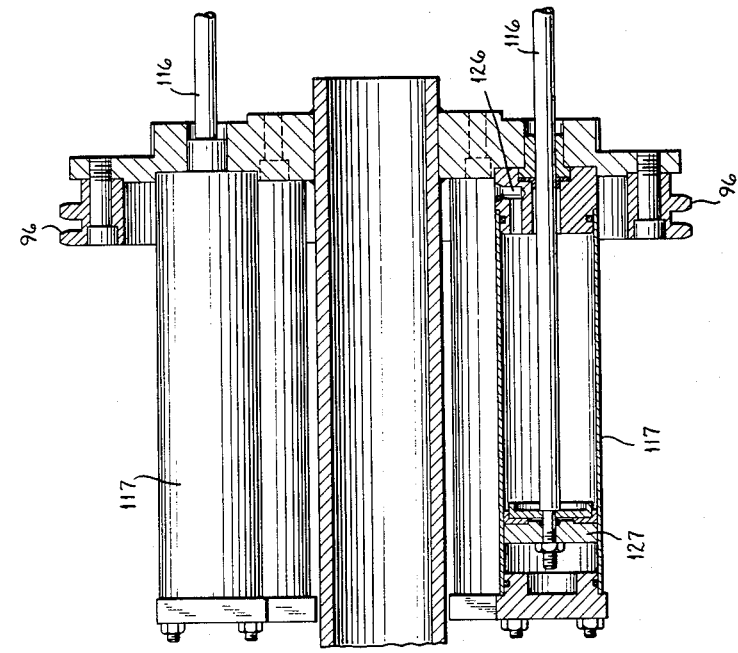
FIG. 8 is a sectional view of the structure shown in FIG. 7, taken on the line 8—8 in FIG. 7.
Figure 7:
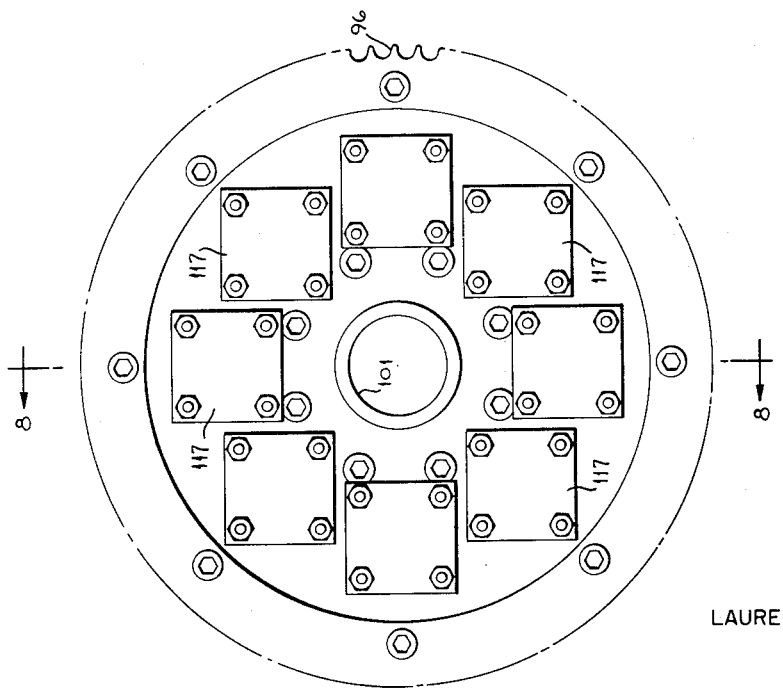
FIG. 7 is an enlarged left-hand end view of a slatted form of center, or mandrel, roll.

As indicated in FIGS. 4, 6, and 8, the center roll, or mandrel roll, 75 may be driven in a counterclockwise direction, as viewed in FIG. 6, by an adjustable speed motor 90 connected by the coupling 91 to a worm gear speed reducer 92. A sprocket 93 on the output shaft of the speed reducer 92 is connected by a sprocket chain 95 to a sprocket gear 96 rigidly secured to the rear end of the mandrel roll 75 in any convenient manner.

It is to be understood that although no driving means are shown for any of the outer rolls 12 to 16, inclusive, the rolls 12 to 16, inclusive, could be driven, if desired, in the same manner as that indicated for the mandrel roll 75. It is noted that in the production of spiral pipe of certain diameters and wall thicknesses, it may be found to be not necessary to have even the center roll, or mandrel roll, as a driven roll if the strip from which the spiral pipe is to be formed is propelled into the cage of rolls with sufficient forces to helically wind the strip into a series of related convolutions.

Moreover, it is noted that in the production of spiral pipe of certain diameters and wall thicknesses, it may not be necessary to include a center roll, or mandrel roll, and that the strip of metal may be helically wound into a series of related convolutions in the roll cage by the effective forces propelling the strip into the spiral pipe forming apparatus.

Figures 9, 10:
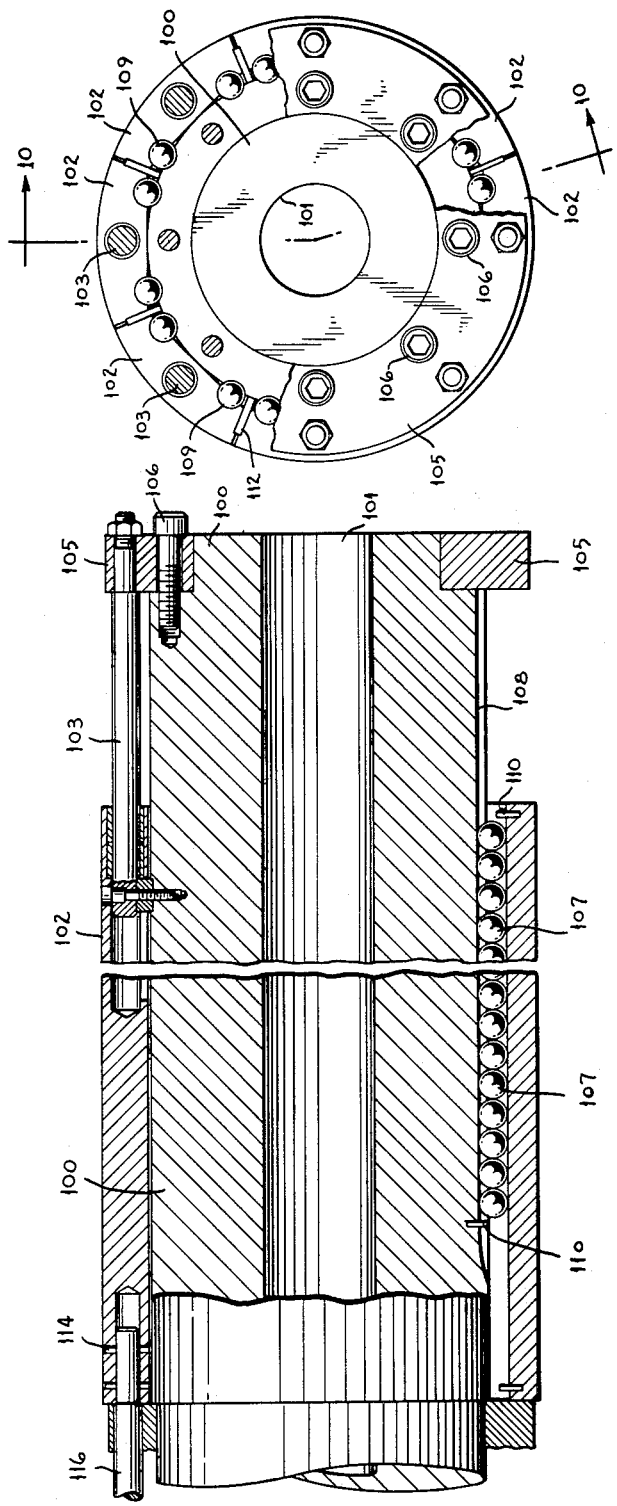
FIG. 9 is an enlarged front end elevation, partly in section, of a slatted form of center, or mandrel, roll.
FIG. 10 is a fragmentary sectional view of the structure shown in FIG. 9, taken on the line 10—10 in FIG. 9.

As stated heretofore, it may be found to be desirable to have the center, or mandrel roll, and/or one or more of the outer rolls which form the cage of rolls of a slatted construction in order to facilitate the movement of convolutions of strip of certain diameters and wall thicknesses through the apparatus. Referring to FIGS. 7 to 11, inclusive, which a form of center, or mandrel, roll of slatted form; the roll core 100 is a solid roll which is provided with an axial bore 101 therethrough. The outer portion of the roll is formed, conveniently, by a series of eight segments, or slats, 102. As shown in FIG. 10, the front end of each segment 102 is bored to form a socket for a rod 103 on which the segment 102 is slidably mounted. The socket is provided, conveniently, with an oilite bushing to provide ease of reciprocating movement of the segment 102 on the rod. The rod 103 is rigidly secured at its front end to a ring member 105 which is rigidly fastened to the outer end of the core 100 by a series of bolts 106, as best shown in FIGS. 9 and 10. The core 100 is provided with a series of channels 108 and each segment member 102 is provided with corresponding channels 109 formed in the undersurface.

The channels 108 and 109 form guideways for a multiplicity of ball bearings 107 to minimize the friction of movement of the segments 102. The ball bearings 107 are confined laterally by pin means 110, as indicated in FIG. 11. I find it convenient to interpose sealing strips 112 of suitable material to prevent foreign matter, such as abrasive flux material, from getting into the ball bearing guideways 108 and 109. As indicated in FIG. 10, each segment 102 is connected by suitable means, such as pins 114, to a piston rod extension 116 of its air cylinder 117.

Each segment 102 of the roll 75 in its rotation is successively engaged by the steel strip, as the steel strip is being helically wound in the roll cage, and the movement of the strip will cause a slat 102 when so engaged to be moved on its rod 103 toward the front end of the roll. As a segment 102 of the roll moves out of engaging contact with the strip because of the rotation of the roll, the segment is freed from forward movement on its rod 103 and the segment is then restored to its initial position at the rear end of the roll by means of its air cylinder 117, the piston rod 116 of which is operatively connected to the segment.

As the air cylinders are carried by and rotate with the roll 75, it is necessary that an air valve assembly be used to afford communication of air to and release of air from each air cylinder. Such an air valve assembly is indicated in FIG. 11, wherein the air passageway 119 of the stationary air inlet and exhaust plate 120 is in communication with the rotatable cylinder intake plate 121 provided with a series of passageways 122 which are connected by suitable piping means 125 to the air port 126 at the underside of the piston 127 of each air cylinder 117. The inlet plate 120 is maintained in fluid-tight relation with the cylinder intake plate 121 by means of a series of compression springs 129 having one end seated in sockets 130 in the spring holder plate 131. The opposite ends of said series of springs 129 bear against the thrust bearing 132. The intake plate 121, plate 120, thrust bearing 132, and spring holder plate 131 are maintained in position between positioning clamps 134 and 135 on the drive adaptor 136.

It is to be noted that if in spiral pipe forming apparatus embodying my invention, the center roll, or mandrel roll, and/or any or all of the outer rolls be of what I have termed "slatted" roll construction, any such "slatted" roll may be converted readily to a solid roll form for all effective purposes, e.g. by merely moving all the segments, or slats, 102 to their forwardmost position and inserting a series of blocks at the rearward ends to thereby prevent any movement of the segments 102. The blocking means may be held, conveniently, by an encircling band. Of course, the air cylinders 117 also would be made inoperative.

It is noted that unless it be contemplated that my improved apparatus might be used for the producing of spiral pipe of a diameter and wall thickness which may make it more desirable to use slatted rolls, all rolls usually would be of the solid roll type. It is obvious that a "slatted" form of roll is far more costly to manufacture than a solid type roll.

Referring to FIGS. 1 and 2, a coil of steel strip 140 is mounted with freedom of rotation in a coil cradle of the well-known construction (not shown) at the rear, or entrance end, of the uncoiler and straightening machine, or roller leveler, 141. The coil cradle, and uncoiler and roller leveler, may be of any of the well-known types fitted for the purpose which are available on the market, and form no part of my invention. The steel strip as uncoiled from the coil 140 passes through a series of power-driven rolls 142 indicated diagrammatically in FIG. 2. The strip is forcibly propelled from the roller leveler through opposed steel plates 143 and 143′ spaced apart only the distance required by the thickness of the strip to the table on which it is carried over an entry roll 145. The entry roll 145 is journalled at its front end in a bearing 145a formed at the upper end of the shaft 146. The roll 145 is journalled at its rear end in a bearing 145b formed at the upper end of the shaft 147. The bearing shaft 146 is slidably key mounted in a guide bearing in the roll support member 39, and the bearing shaft 147 is slidably key mounted in a guide bearing in the roll support member 49.

The entry roll 145 is adapted to be moved vertically upwardly or downwardly by connected gear means in engagement with the screw-threaded lower portions of the shafts 146 and 147. The tops of the two rolls 145 and 16 are maintained in the same plane. The propelled straightened strip 140 moves from the table 144 to the rolls 145 and 16 in a plane tangential to the top of the rolls.

The entrance angle at which the steel strip enters the forming apparatus to be formed helically into a series of related convolutions depends upon the width of the strip and the diameter of the pipe to be produced. Accordingly, the frame support 150 for the roller leveler 141 is pivotally movable about a pivot member 151 rigidly fixed to the bed plate, or base, 2 of the forming and welding apparatus. The frame support 150 is provided with roller means 153 which engage arcuate tracks 154 to facilitate movement of the uncoiler and roller leveler to effect a change in the entrance angle of the steel strip to the cage of rolls. As the forming and welding apparatus is capable of producing spiral pipe of varying diameters, it is necessary to raise and lower the uncoiler, roller leveler, and table 44 so that the strip may be tangential to the tops of the changed positions of the rolls 145 and 16. Such raising or lowering of the roller leveler, etc. may be effected by any convenient means.

In FIG. 1, I have indicated somewhat diagrammatically raising and lowering means consisting of a series of jack screws 156, conveniently mounted at the four corners of the frame support 150. The channel members 157 on which the roller leveler is mounted are rigidly connected to the top surface pads of the shafts of the jack screws. The series of jack screws are connected together in the well-known manner by suitable shafts and gearing so that all jack screws may be raised or lowered simultaneously. Movement of the jack screws is effected mechanically by an electric motor and worm gear speed reducer, or the like, operatively connected to the means for effecting simultaneous movement of the jacks.

The support 161 for the forward end of the table 144, correspondingly, is adjustable in accordance with the changes in height of the roller leveler.

Although I have described herein the effecting of a change in entrance angle at which the strip enters the forming apparatus by moving the coil of strip, roller leveler, etc. about a pivot point on the bed plate 2 of the forming apparatus, it is obvious that the roller leveler, etc. could be maintained in fixed position and the forming and welding apparatus made pivotally movable with respect to a stationary roller leveler, etc. Correspondingly, the forming and welding apparatus could be mounted on jack screws, or the like, and the forming and welding apparatus raised or lowered in setting for production of pipe of varying diameters so that strip forcibly propelled at a fixed level from the roller leveler, etc. would enter the forming and welding apparatus tangential to the top of the entry and bottom rolls thereof.

The strip 140 passes from the entry roll 145 to the top of the bottom roll 16, then beneath the center roll, or mandrel roll, 75 and thereafter to the rolls 12, 13, 14, and 15. The edges of the abutting convolutions are welded at the point indicated by "X," which is at a point slightly less than 180° of the entering convolution, and where the forward edge of the entering convolution is welded to the rearward edge of the preceding convolutions, said edges being in abutting relationship at this point. Of course, the point of weld could be at any point after the aforesaid weld point of slightly less than 180°.

The abutting edges of the convolutions may be welded by any of the well-known welding means, such as submerged arc welding, resistance welding, high frequency welding, gas welding, etc. In FIG. 1 I have indicated submerged arc welding means, including a diagrammatic representation of any of the well-known welding heads 170 which is adapted to feed welding wire 171 from the supply coil 172. A welding flux supply hopper 174 is connected in the well-known manner by a conduit 175 to furnish flux at the point of weld.

As hereto stated, the center roll, or mandrel roll, is provided with an axial bore 101 completely therethrough. A rigid pipe 175, extending at each end beyond the mandrel length, is provided at its front end with a bracket and supporting means 176 on which is mounted a small air cylinder 177 carrying a welding back-up shoe 178 which is positioned in the well-known manner at the weld point. If the welding back-up shoe is water-cooled, the water conduit connections thereto are also carried through the bore 101 in addition to the air conduit for supplying air to the air cylinder 177 utilized to maintain the welding shoe 178 in contact with the inner surface of the steel strip at the point of weld.

If desired, the abutting edges of the helically wound convolutions of strip as heretofore described may be welded internally by welding means supported on the forward end of the pipe 175, which extends through and beyond the axial bore 101 of the center roll, or mandrel roll, 75; or, if desired, the helically wound convolutions of strip may be welded both externally and internally in the manner described.

The base, or bed plate, 2 of the forming and welding apparatus may be extended at its rearward end so that the mandrel roll and its supports may be retracted as a separate unit to a position rearward of the forming and welding apparatus per se, so that the forward end of the mandrel roll and the forward end of the pipe 175 supporting the welding back-up shoe and/or the internal welding means will be in the open. If difficulties occur at the welding back-up shoe zone in apparatus in which the mandrel roll is not retractable, it is necessary to cut out a section of pipe around this back-up shoe area and make the necessary repairs or replacements by working through such opening which is at a most inconvenient location for working.

I find it desirable to support the finished spiral pipe 180 as it emerges from the forming and welding apparatus by means of an adjustable support 181 of any of the well-known types, such as that indicated in FIG. 1.

*Operation*

The apparatus as shown herein was designed for the production of spiral pipe within a diameter range of 14 in. to 24 in. from steel strip with a possible maximum thickness of .250 in.

The rolls 12 to 16 of the cage of rolls are moved simultaneously and concentrically in the manner heretofore described so that the effective diameter of the cage of rolls is the outside diameter of the spiral pipe to be produced. The positioning of the rolls to the proper effective cage diameter may be done facilely by using a templet ring or rings which have the same diameter as that of the pipe to be produced. The entry roll 145 is correspondingly moved so that the top of the roll 145 is in the same plane as the top of the bottom roll 16 of the cage of rolls.

In the production of spiral pipe of a given outside diameter from steel strip, it is desirable to use the width of strip which will produce the most pipe with the least amount of welding. The entrance angle, or feed angle, of the strip varies with the width of the strip. For example, in the production of 16″ O.D. spiral pipe from 32″ width strip, the entrance or feed angle with respect to the axes of the rolls 16, 12, etc. of the cage of rolls is 50° 28″ or 50.5 degrees; and in the production of 16″ O.D. spiral pipe from 40″ width strip, the entrance or feed angle is 37° 16″.

The roller leveler 141, with the coil or strip 140, platen table 144, etc. is properly moved about the pivot 151 in the manner heretofore described so that the straightened strip 140 will be moved at the mathematically determined entrance angle for the width of strip being used.

The roller leveler 141, with the coil of strip 140, platen table 144, etc. is then raised or lowered in the manner heretofore described so that the strip 140 will be moved in a plane to the top of the rolls 145 and 16. The support 161 at the forward end of the table 144 is correspondingly adjusted in accordance with the changes made in the table 144, etc.

If required, the rolls 12 to 16 and 145 may be moved horizontally in the manner heretofore described by movement as a unit of the roll support members at the forward and rear ends of any roll required to be repositioned.

The strip 140 is uncoiled by the uncoiler in the well-known manner and, as indicated in FIG. 5, passes between the first opposed pair of power-driven pusher rolls of the roller leveler 141, thence through the leveler rolls, indicated diagrammatically by the five smaller diameter rolls, and thence between the second opposed pair of power-driven pusher rolls. The strip is forcibly propelled between the opposed steel plates 143 and 143′, or platen members, in a plane to the top of the entry roll 145 and the bottom roll 16. If required, guide rollers or guide shoes may be utilized to maintain the longitudinal movement of the strip at the set entrance angle.

The strip moves from the roll 16 beneath the properly positioned center or mandrel roll 75 to the roll 12. The mandrel roll is positioned in the manner heretofore described so that an initial curvature of a greater radius than the radius of the pipe to be formed is imparted to the longitudinally moving strip 140 diagonally of its longitudinal axis.

The strip 140 is helically wound in the cage of rolls into convolutions to form a pipe of an outside diameter which is the effective diameter of the cage of rolls. As the initial curvature imparted to the strip is of a greater radius than the radius of the pipe to be formed, and as such initially curved strip is helically wound into convolutions while confined by the rolls of the roll cage to a radius of curvature which is less than the initial radius of curvature imparted to the strip, roundness and maintenance of the desired diameter of the resultant pipe is assured. As indicated in FIG. 2, an edge guide roll, or rolls, 180 is positioned approximately at the point where the rear edge of the strip 140 has made an initial one half of a convolution to assure the maintenance of the strip in proper location.

It is important to note in my apparatus that the multiplicity of rolls of the roll cage exert resistance to the longitudinal movement of the curved strip which is sufficient to cause abutment of the forward edge of the convolution being formed with the rear edge of the next preceding fully formed convolution. However, the rolls of the roll cage exert no circumferential resistance to the movement of the curled strip in the cage of rolls as would tend to unwind or open the "seam."

It is noted that in the prior art apparatus for forming spiral pipe, those skilled in the art endeavored to have all forming means as near frictionless as possible.

The abutting edges of the convolutions are welded together, conveniently, at a point slightly in advance of the point where the front edge of the convolution being formed has made a half turn, as indicated at 171 in FIG. 6, and at "X" in FIG. 2.

As indicated in FIG. 1, said abutting edges are continuously welded together by submerged arc welding with use of a welding head 170 of the well-known type, electrode wire 172, and flux supplied at the point of weld in the well-known manner by the flux conduit connected to the welding flux supply hopper 174.

Although I have referred to outside submerged arc welding, it is obvious that the abutting edges of the convolutions can be welded on the inside, and that said abutting edges can be welded by a combination of outside and inside welding.

It also is important to note that the initial imparting of a curvature of greater radius to the strip than the radius of the pipe to be formed and the winding of such initial curved strip helically into convolutions while confined in a roll cage of a radius less than the initial radius effects a cold working of the metal strip to a certain degree, and no special devices are required to maintain the edges even in an up and down direction. Any commercially allowable camber of ¼ in. in 8 ft. of length in the strip is absorbed, or distributed to a non-effective degree in advance of welding.

I do not desire to limit myself to the apparatus and method of operation as specifically described herein, as it is obvious that various modifications may be made therein without departing from the essential features of my invention.

I claim:

1. Apparatus for making spiral pipe from helically wound elongated metal strip comprising a roll cage comprising a circular series of spaced-apart axially parallel elongated rolls forming an extended circular throat of an effective diameter substantially equivalent to the desired outside diameter of the spiral pipe to be formed; bearing means at the respective opposite ends of each of said rolls; support means for said bearing means; a welding head intermediate said bearing means; a mandrel roll within said roll cage having a free end and a supported end, the axis of said mandrel roll being parallel with the axes of said rolls forming said roll cage, the free end of said mandrel terminating between the welding head and the supported end of the mandrel; means for imparting to said elongated metal strip, diagonally of its longitudinal axis, an initial curvature of greater radius than the radius of the pipe to be formed; whereby on passage of said strip within said roll cage, said strip is yieldably constricted to the radius of the pipe to be formed and is caused to bear against the rolls of said roll cage to resist longitudinal movement, thereby to cause abutment of the edges of said helical convolutions; bearing supporting means at the rearward end of said mandrel roll; and welding means for continuously welding together the abutting edges of said convolutions.

2. Apparatus for making spiral pipe from helically wound elongated metal strip comprising a roll cage comprising a circular series of spaced-apart axially parallel elongated rolls forming an extended circular throat of an effective diameter substantially equivalent to the desired outside diameter of the spiral pipe to be formed; bearing means at the respective opposite ends of each of said rolls; support means for said bearing means; a welding head intermediate said bearing means; a single mandrel roll within said roll cage having a free end and a supported end, the axis of said mandrel roll being parallel with the axes of said rolls forming said roll cage, the free end of said mandrel terminating between the welding head and the supported end of the mandrel; means for imparting to said elongated metal strip, diagonally of its longitudinal axis, an initial curvature of greater radius than the radius of the pipe to be formed; whereby on passage of said strip within said roll cage, said strip is yieldably constricted to the radius of the pipe to be formed and is caused to bear against the rolls of said roll cage to resist longitudinal movement, thereby to cause abutment of the edges of said helical convolutions; bearing supporting means at the rearward end of said mandrel roll; and welding means for continuously welding together the abutting edges of said convolutions.

3. Apparatus for making spiral pipe from helically wound elongated metal strip comprising a roll cage comprising a circular series of spaced-apart axially parallel elongated rolls forming an extended circular throat of an effective diameter substantially equivalent to the desired outside diameter of the spiral pipe to be formed; bearing means at the respective opposite ends of each of said rolls; support means for said bearing means; a single driven mandrel roll within said roll cage having a free end and a supported end, the axis of said mandrel roll being parallel with the axes of said rolls forming said roll cage, means adjusting the axis of the mandrel for imparting to said elongated metal strip, diagonally of its longitudinal axis, an initial curvature of greater radius than the radius of the pipe to be formed; whereby on passage of said strip within said roll cage, said strip is yieldably constricted to the radius of the pipe to be formed and is caused to bear against the rolls of said roll cage to resist longitudinal movement, thereby to cause abutment of the edges of said helical convolutions; bearing supporting means at the rearward end of said mandrel roll; and welding means for continuously welding together the abutting edges of said convolutions at a point in the roll cage beyond the free end of the mandrel.

4. Apparatus for making spiral pipe from helically wound elongated metal strip comprising a roll cage comprising a circular series of spaced-apart axially parallel elongated non-driven rolls forming an extended circular throat of an effective diameter substantially equivalent to the desired outside diameter of the spiral pipe to be formed; bearing means at the respective opposite ends of each of said rolls; support means for said bearing means; a single driven mandrel roll within said roll cage having a free end and a supported end, the axis of said mandrel roll being parallel with the axes of said rolls forming said roll cage, means for adjusting said mandrel axis thereby imparting to said elongated metal strip, diagonally of its longitudinal axis, an initial curvature of greater radius than the radius of the pipe to be formed; whereby on passage of said strip within said roll cage, said strip is yieldably constricted to the radius of the pipe to be formed and is caused to bear against the rolls of said roll cage to resist longitudinal movement, thereby to cause abutment of the edges of said helical convolutions; bearing supporting means at the rearward end of said mandrel roll; and welding means for continuously welding together the abutting edges of said convolutions in the roll cage beyond the free end of the mandrel.

References Cited by the Examiner

UNITED STATES PATENTS

| | | | |
|---|---|---|---|
| 725,723 | 4/1903 | Kirk | 153—64 |
| 1,689,374 | 10/1928 | Williams | 219—62 |
| 1,773,994 | 8/1930 | Gladkov | 113—35 |
| 1,793,281 | 2/1931 | Freeze | 113—35 |
| 1,923,284 | 8/1933 | Taylor et al. | 219—62 |
| 2,059,578 | 11/1936 | Henning | 113—35 |
| 2,635,572 | 4/1953 | Hesterman | 113—35 |
| 2,729,180 | 1/1956 | Freeze | 113—35 |
| 3,070,054 | 12/1962 | Grieten | 113—35 |

FOREIGN PATENTS

| | | |
|---|---|---|
| 14,172 | 8/1900 | Great Britain. |
| 846,621 | 8/1960 | Great Britain. |

WHITMORE A. WILTZ, *Primary Examiner.*